United States Patent [19]
Herzhoff et al.

[11] 3,915,712
[45] Oct. 28, 1975

[54] PROCESS AND AN APPARATUS FOR IMPROVING THE PROPERTIES OF SOLUTIONS HAVING A HIGH SOLIDS CONTENT, WHICH ARE TO BE USED FOR COATING A TAPE PARTICULARLY SOLUTIONS OF PHOTOGRAPHIC EMULSIONS

[75] Inventors: Peter Herzhoff, Leverkusen; Fritz Maus; Hans Gref, both of Cologne; Stephan Platz, Leverkusen, all of Germany

[73] Assignee: Agfa-Gevaert Aktiengesellschaft, Leverkusen-Bayerwerk, Germany

[22] Filed: Sept. 28, 1973

[21] Appl. No.: 401,675

Related U.S. Application Data

[63] Continuation-in-part of Ser. No. 43,721, June 5, 1970, abandoned.

[30] Foreign Application Priority Data

July 12, 1969 Germany............................ 1935555

[52] U.S. Cl.................. 96/87 R; 96/114.8; 96/144; 96/200; 427/338; 122/39; 159/2 R; 159/6 WH; 159/9 A; 159/12; 159/13 A; 159/16 S; 159/47 R; 159/DIG. 21; 202/205; 202/236; 203/95
[51] Int. Cl.² ........................ B05D 3/04; B05D 3/10
[58] Field of Search ............. 117/34, 164; 96/114.8, 96/200; 159/2 R, 13 A, 16 S, 47 R, DIG. 21, 9 A, 12, 6 WH; 202/205, 236; 203/95; 122/39

[56] References Cited
UNITED STATES PATENTS
2,779,724  1/1957  Dunning et al. ..................... 252/321
3,502,494  3/1970  Ishiwata et al. ........................ 117/34

OTHER PUBLICATIONS
"Making & Coating Photographic Emulsions," Zelikman and Levi, Focal Press 1964; pp. 61–62.

*Primary Examiner*—William R. Trenor
*Attorney, Agent, or Firm*—Connolly and Hutz

[57] ABSTRACT

A process and apparatus for improving and maintaining the concentration, and homogeneity of gelatino silver halide emulsions with a high solids content reservoir bath for tape coating a photographic emulsion, wherein the coating emulsion is partly withdrawn from the bath and circulated through a known type of falling film evaporator to which a vacuum is applied and processed to concentrate, degasify and homogenize the withdrawn emulsion. A ballast steam under high velocity is injected into the falling film of emulsion to act on the emulsion.

1 Claim, 1 Drawing Figure

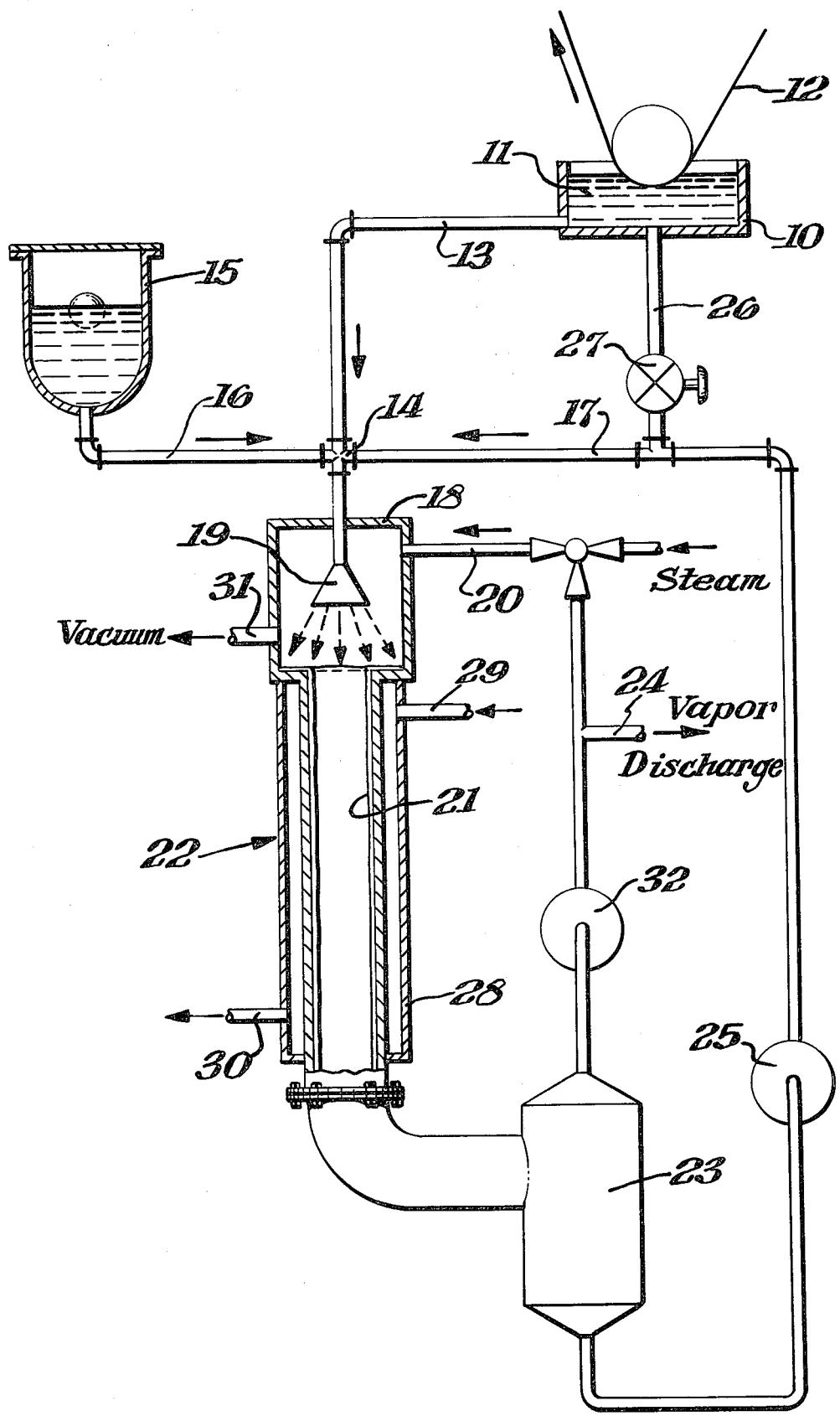

PROCESS AND AN APPARATUS FOR IMPROVING THE PROPERTIES OF SOLUTIONS HAVING A HIGH SOLIDS CONTENT, WHICH ARE TO BE USED FOR COATING A TAPE PARTICULARLY SOLUTIONS OF PHOTOGRAPHIC EMULSIONS

This application is a continuation-in-part application of U.S. application Ser. No. 43,721, filed June 5, 1970, now abandoned, entitled "Process and an Apparatus for Improving the Properties of Solutions Having a High Solids Content, Which are to be Used for Coating a Tape Particularly Solutions of Photographic Emulsions".

BACKGROUND OF THE INVENTION

The invention relates to a process and to an apparatus for improving the concentration, degasification and homogenisation of solutions having a high solids content which are to be used for coating a tape particularly solutions of photographic gelatino-silver halide emulsions.

The concentration, degasification and homogenisation have hitherto been carried out separately. Solutions treated in this way gave rise to coatings, the surfaces of which had inclusions of bubbles, pale or dark spots, clouds and longitudinal, transverse and diagonal stripes, etc. Because of uncontrollable foam formation, such a process, in which the individual stages are carried out in a sequence, cannot be maintained continuously.

The above-mentioned disadvantages are particularly pronounced in photographic gelatino-silver halide emulsions, because these coating solutions are not uniform solutions, but are, from a physical point of view, heterogeneous structures in which temperature differences, differences in the viscosity of the components and impurities (e.g. fats and oils) give rise to the expected disagreeable coating defects, particularly where surface formation processes take place rapidly.

In the coating of a tape with a gelatino-silver halide emulsion it is desirable to keep small the reservoir from which the coat is cast on the substrate which is a moving tape. At the same time it is necessary to continuously resupply an adequate quantity of emulsion to the small reservoir and finally it is essential that emulsion be not heterogeneous as indicated above. Therefore, the gelatino-silver halide emulsion for casting is improved if the emulsion from the fresh supply is concentrated, degasified and homogenized. Further it is desirable if these treatments are simultaneous.

Many processes which employ film evaporation have been used for such purposes as improving separation of liquids, improving heat exchange in distillation processes, and evaporation from a pulp slurry and of a photographic emulsion. For example it has been known to distribute a fluid to be evaporated in films in tubes and then recirculate the vapor formed from the distilled film to improve turbulence in the falling film. This is known to improve heat transfer. This, however, does not provide the action necessary for homogenizing and concentrating a composition such as a gelatino-silver halide emulsion.

It has been discovered that the gelatino-silver halide emulsion in a coating bath for casting as a photographic coating can be maintained in a homogeneous condition with high solids content by processing emulsion of a viscosity of 12 up to 200 cp when withdrawn from the coating bath to degasify, homogenize and concentrate the emulsion to increase the viscosity and the solids content up to 400 centipoise and 30% solids by weight. The emulsion withdrawn from the coating bath to be concentrated and homogenized may be mixed with additional emulsion and fed to the homogenizing and concentrating process, or the emulsion from the coating bath may be fed directly to the processing. The emulsion to be concentrated is passed as a film flowing downwardly in a column over a heated surface under a reduced pressure decreasing from a range of 80 to 150 mm Hg at the head of the column to 30 to 50 mm Hg at the end of the column and a temperature of from 47°–60°C at the head of the column to a pressure midway in the column of 55 mm Hg when the head pressure is 80 mm Hg and 100 mm Hg when the head pressure is 150 mm Hg and to 29°–38°C at the end of the column. The flowing film is subjected to the introduction of high velocity steam injected into the column at the head and streaming through the column at a velocity of 250 to 300 meters per second. The injected steam enters the head of the falling film evaporator at a pressure ranging from 150 to 250 mm Hg and a temperature of between 60° and 72°C. The steam throughput of the processing ranges from 500 kg to 600 kg per hour for an emulsion throughput of from 1800 to 2400 kg per hour.

The emulsion fed at the indicated rates and temperatures and flowing downwardly in the column forms a film on the column walls which is subject to introduction of injected steam.

The emulsion is separated from the steam in the separator at the end of the column and the product emulsion has increased viscosity, a higher solids content and is more homogeneous than before processing.

Therefore it is an object of this invention to obviate the disadvantages of previous methods of treatment and to produce forces in a film of gelatino-silver halide emulsion which brings about simultaneous homogenizing, concentration and degasification.

SUMMARY OF THE INVENTION

A gelatino-silver halide emulsion for casting as a coating on a moving substrate is treated by transporting the emulsion, by circulation, through an inverted flow evaporation to which a vacuum is applied. The gelatino-silver halide emulsion has a viscosity of between 20–400 cp and is a stable mass of finely divided crystalline silver halide dispersed and suspended in gelatin in which the silver halide crystals remain suspended without dissolving. The gelatin is a protein which acts as a binding medium. A ballast steam is introduced into the falling film evaporator at a high steam velocity so as subject a thin film of the emulsion flowing down heated surfaces of the evaporator to a high shearing force from the injected steam. The protein-containing gelatin in the gelatino-silver halide emulsion is acted upon in the circulating process as the thin film of liquid flows down the heated surfaces of the falling film evaporator and is exposed to a resulting homogenising effect on the emulsion. The emulsion is kept circulating continuously. The amount worked up by the coating device and the amount of water in the emulsion removed in the evaporator in the form of steam is replaced in the appropriate quantity by a regulated inflow and fed into the circulation.

The attached drawing illustrates the process of this invention.

For the circulation of the coating solution in the vacuum evaporator, a pump is required, the hourly output of which must be large in comparison with the volume of liquid circulating in the evaporator. Compared with the quantity worked up by the coating device, the quantity of solution kept in circulation must be of such a large quantity that, if there is any variation in the properties of the fresh supply of liquid, the properties of the liquid in circulation are not changed abruptly.

If, however, the important properties of the inflowing liquid (from the regulating tank), such as viscosity and solids content, are kept very constant, the liquid reserve in the system may be kept small, which in view of the inertia of the installation is desirable for purposes of regulation and, for example, when there is a change of plan. For the avoidance of foam formation in the evaporator, defoaming agents may be added to the fresh supply, e.g. higher alcohols which are only effective if they form a two-phase mixture with the coating solution. This mixture does not interfere with the coating process since the second phase has been very finely emulsified in the falling film evaporator because of the deliberately high velocity of the steam.

An apparatus for carrying out the process is shown diagrammatically in the drawing.

A reservoir 10 contains an emulsion bath 11 made up of a gelatino-silver halide emulsion. A moving strip-form substrate 12 has the emulsion applied to it in the bath 11. The reservoir 10 has a conduit 13 leading from the reservoir 10 to a mixing valve 14. Emulsion withdrawn from the bath 11 is mixed with additional emulsion in the mixing valve 14. The additional emulsion is carried to the mixing valve 14 from a storage vessel 15 through conduit 16 and through a conduit 17 recirculated, processed emulsion is fed to the mixing valve 14.

The mixed emulsion is sprayed into a head 18 through a nozzle 19 and subjected to the injection of ballast steam injected into the head 18 from a pressure tube 20. The steam injected emulsion then passes in a falling film down the inside heated surface of a falling film evaporator 22 to a separator 23. In the separator 23 steam freed from the emulsion is sucked away through a vapor discharge tube 24. A compressor 32 is provided. The processed emulsion is recirculated by pump 25 into conduit 17. A shunt conduit 26 connects 17 with the reservoir 10 and has a valve 27 which determines the proportion of processed and circulated emulsion which is bled into the bath 11.

The falling film evaporator 22 is provided with a steam jacket 28 for supplying heat to the down-flowing emulsion film 21. This heat causes evaporation which balances the condensation in the emulsion of the injected steam. Suitable inlet and outlet 29 and 30 are provided for the steam flow. The vacuum in the evaporator 22 is created through exhaust duct 31.

EXAMPLE

A homogenized and concentrated silver halide emulsion was prepared as above described. An emulsion of 10% silver halide solids in a gelatin medium having a viscosity of 12 centipoise was fed into the head of an evaporator column at a pressure of 100 mm Hg and a temperature of 52°C in the evaporator head. The emulsion was passed in the form of a downwardly flowing film along vertical walls of a heated column which at the point midway of the column had a pressure of 15 mm Hg and temperature of 45°C. As the emulsion passed through column steam was injected into the column from an injector valve at a pressure of 150 mm Hg and temperature of 60°C at the valve through the head at a velocity of 282 meters per second. The steam was injected into the moving emulsion film and the steam stream and emulsion film passed from the column into a separator where the pressure was 50 mm Hg and temperature 38°C. The steam was separated from the emulsion in the separator to provide a homogenized silver halide emulsion having viscosity of 34 centipoise and a 15% solids content.

In addition to the emulsification brought about by the high velocity of the steam, degasification and concentration of the solution are carried out in the same operational step so that the cost of the apparatus and labor is considerably less than in the processes previously employed.

What is claimed is:

1. In the process of coating strip-form substrates with a coating of gelatino-silver halide emulsion of uniform homogeneity and controlled viscosity, the substrate being wetted in a reservoir in which the emulsion is supplied to the substrate the improvement which consists of continuously withdrawing a portion of gelatino-silver halide emulsion having a certain solids content from the reservoir, mixing said withdrawn emulsion in a mixing step with an additional supply of gelatino-silver halide emulsion having a viscosity of 20–400 cp, regulating the rate of additional supply at a value that the liquid level in the coating reservoir is kept constant, introducing the mixed emulsion from said mixing step into the head of an evaporator column at a pressure ranging from 150 to 250 mm Hg and a temperature of between 60° and 72°C, moving a thin film of said emulsion in a falling film downwardly over a heated surface in a vertical column from the head, injecting a quantity of ballast steam at a high velocity against said thin film of the emulsion flowing down the heated surface of evaporation chamber, shearing the downwardly flowing emulsion with the high velocity ballast steam, regulating the velocity of the applied ballast steam, thereby increasing the solids content of the emulsion and simultaneously homogenizing, degasifying and evaporating the emulsion to a uniform viscosity, to provide an emulsion of uniform, homogenized viscosity at the end of the column at a pressure of 30 to 50 mm Hg and temperature of from 47–60°C, passing the homogenized, uniform viscosity emulsion to a conduit, dividing the homogenized, uniform viscosity emulsion in the conduit and delivering a controlled portion of the homogenized emulsion to said mixing step so as to provide a continuously, substantially homogeneous emulsion in said reservoir for coating on said substrate.

* * * * *